US007346020B2

United States Patent
Kwon et al.

(10) Patent No.: US 7,346,020 B2
(45) Date of Patent: Mar. 18, 2008

(54) APPARATUS FOR TRANSMITTING/RECEIVING DATA ON A PACKET DATA CONTROL CHANNEL IN A COMMUNICATION SYSTEM

(75) Inventors: Hwan-Joon Kwon, Seoul (KR); Ho-Kyu Choi, Songnam-shi (KR); Dong-Hee Kim, Seoul (KR); Youn-Sun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1088 days.

(21) Appl. No.: 10/288,806

(22) Filed: Nov. 6, 2002

(65) Prior Publication Data

US 2003/0086384 A1    May 8, 2003

(30) Foreign Application Priority Data

Nov. 6, 2001  (KR)  .................. 10-2001-0068964

(51) Int. Cl.
*H04B 7/216* (2006.01)
*H04B 7/212* (2006.01)
*H04Q 7/00* (2006.01)

(52) U.S. Cl. .................. 370/320; 370/321; 370/347; 370/441; 370/442; 370/329; 370/341

(58) Field of Classification Search ........... 370/320, 370/321, 347, 441, 442, 329, 341
See application file for complete search history.

(56) References Cited

U.S. PATENT DOCUMENTS

| 6,804,220 B2* | 10/2004 | Odenwalder et al. ....... 370/337 |
| 2003/0048856 A1* | 3/2003 | Ketchum et al. ............ 375/260 |
| 2003/0072305 A1* | 4/2003 | Odenwalder et al. ....... 370/389 |

* cited by examiner

*Primary Examiner*—Barry Taylor
(74) *Attorney, Agent, or Firm*—The Farrell Law Firm, PC

(57) ABSTRACT

An apparatus and method for transmitting/receiving a PDCCH (Packet Data Control Channel) for efficient packet data transmission in a communication system supporting packet data service. To allow both TDM-transmission and TDM/CDM-transmission of packet data, the PDCCH has a different format depending on the transmission scheme of the packet data. A receiver operates in BSD (Blind Slot Detection) to detect the transmission scheme of received packet data and the format of the PDCCH.

11 Claims, 5 Drawing Sheets

APPARATUS FOR TRANSMITTING/RECEIVING DATA ON A PACKET DATA CONTROL CHANNEL IN A COMMUNICATION SYSTEM

PRIORITY

This application claims priority to an application entitled "Apparatus for Transmitting/Receiving Data on Packet Data Control Channel in a Communication System" filed in the Korean Industrial Property Office on Nov. 6, 2001 and assigned Ser. No. 2001-68964, the contents of which are hereby incorporated by reference.

BACKGROUND OF THE INVENTION

1. Field of the Invention

The present invention relates generally to an apparatus and method for providing a packet data service in a communication system, and in particular, to a packet data transmitting/receiving apparatus and method for detecting a packet data transmission/reception scheme.

2. Description of the Related Art

While a typical mobile communication system supports voice service only, user needs and the development of mobile communication technology have introduced a mobile communication system that additionally supports data service.

In a mobile communication system supporting multimedia service including voice and data services, a plurality of users receive voice service in the same frequency band and data service in TDM (Time Division Multiplexing) or TDM/CDM (Time Division Multiplexing/Code Division Multiplexing). One code applies to one slot assigned to a particular user in TDM, whereas a predetermined time is divided into a plurality of slots and a plurality of users to which unique orthogonal codes (e.g., Walsh codes) are assigned for identification use one time slot simultaneously in TDM/CDM.

An F-PDCH (Forward Packet Data Channel) is transmitted in a different manner depending on whether TDM or TDM/CDM is used. In TDM, packet data is delivered to a single user for a predetermined time period. Basically, all available Walsh codes are used as spreading codes for the F-PDCH.

In TDM/CDM, the F-PDCH delivers packet data to two or more users for a predetermined time period. Selected Walsh functions are used to spread data for the users to identify their data. Hence, information about Walsh functions used for the respective users is transmitted to the users on a PDCCH (Packet Data Control Channels).

The PDCH delivers packet data on a PLP (Physical Layer Packet) basis. PLP length is variable. To efficiently receive packet data on the PDCH, a control information frame (preamble) containing necessary control information is transmitted on the PDCCH (e.g., a secondary PDCCH: SPDCCH).

If the PDCH is transmitted in TDM/CDM, that is, if packet data is transmitted to a plurality of users simultaneously in one or more slots in CDM, the amount of control information in a preamble is variable according to the number of the users. The length of the preamble depends on the length of the packet data. In other words, once the receiver estimates the length of the preamble, the receiver can determine the packet data length. The preamble length is estimated by BSD (Blind Slot Detection).

FIG. 1 is a block diagram illustrating a conventional PDCCH transmitter supporting only TDM for PDCH transmission. Referring to FIG. 1, it is assumed that control information transmitted on the PDCCH, a PDCCH input sequence is 13 bits for N slots (N is 1, 2 or 4), but is not limited to 13 bits. The slot length of the PDCCH input sequence varies according to the slot length of packet data, but is determined irrespective of the length of a preamble. For example, if the packet data length is 1, 2, 4, or 8 slots, the preamble has a corresponding length. If the packet data is transmitted in 1 slot, a 1-slot preamble is transmitted. If the packet data is transmitted in 2 slots, the preamble is also 2 slots. If the packet data occupies 4 slots, the preamble is also transmitted in 4 slots. However, if the packet data is 8 slots, a 4-slot preamble is transmitted to avoid an excess increase in the preamble length.

In operation, a CRC adder 101 adds eight CRC bits to the 13-bit PDCCH input sequence. As the number of CRC bits increases, transmission error detection performance increases. Yet, power efficiency decreases. Thus eight CRC bits are usually used.

A tail bit adder 102 adds eight tail bits with all 0s to the CRC-attached control information received from the CRC adder 101. A convolutional encoder 103 encodes the output of the tail bit adder 102 at a code rate (R) of ½ for N=1, and at a code rate R of ¼ for N=2 or 4. Hereinafter, N indicates the slot length of control information on the PDCCH. A preamble has twice as many symbols after R=¼ encoding than after R=½ encoding, and a four-slot preamble needs to have twice as many symbols as a two-slot preamble. Therefore, a symbol repeater 104 repeats the four-slot preamble correspondingly. That is, the symbol repeater 104 simply outputs input data or repeats it once or three times, according to the slot length of the data. As a result, the symbol repeater 104 outputs 58N (N is 1, 2, or 4) symbols.

A puncturer 105 punctures 10N symbols in the output of the symbol repeater 104 and outputs 48N symbols to minimize performance degradation and match a desired data rate. An interleaver 106 interleaves the punctured symbols to permute the sequence of the symbols and thus reduce burst error rate. A BRI (Bit Reverse Interleaver) can be used as the interleaver 106. The BRI maximizes the space between adjacent symbols. After interleaving, the first half of the symbol sequence has even-numbered symbols and the second half, odd-numbered symbols. A modulator 107 modulates the interleaved symbols in a modulation scheme such as QPSK (Quadrature Phase Shift Keying).

FIG. 2 is a block diagram illustrating a conventional PDCCH receiver. Referring to FIG. 2, to determine the number of slots in which packet data is received from the transmitter, the receiver includes first to fourth reception units 210 to 240. The slot length of the packet data is determined through the CRC-check of the received data in the first to fourth reception units 210 to 240. The first reception unit 210 processes a one-slot preamble for one-slot packet data, the second reception unit 220 processes a two-slot preamble for two-slot packet data, the third reception unit 230 processes a four-slot preamble for four-slot packet data, and the fourth reception unit 240 processes a four-slot preamble for eight-slot packet data.

In each reception unit, a deinterleaver deinterleaves the received packet data according to a corresponding slot length and a depuncturer depunctures the deinterleaved symbols according to the slot length. In the third and fourth reception units 230 and 240, combiners 235 and 245 combine two consecutive symbols corresponding to the operation of the symbol repeater 104 illustrated in FIG. 1.

A convolutional decoder 216 decodes the depunctured symbols received from the depuncturer 214 at a code rate of ½, a convolutional decoder 226 decodes the depunctured symbols received from the depuncturer 224 at a code rate of ¼, and convolutional decoders 236 and 246 decode the combined symbols received from the combiners 235 and 245 at a code rate of ¼.

CRC checkers 218 to 248 CRC-check the decoded symbols using predetermined initial values. A packet length determiner 250 determines the slot length of the packet data according to the reception results received from the reception units 210 to 240. The reception units 210 to 240 may be separated physically or integrated into one reception unit with different reception parameters.

FIG. 3 is a diagram illustrating slot detection timing and slot lengths when the receiver illustrated in FIG. 2 receives the PDCCH. As noted from FIG. 3, the first to fourth reception units 210 to 240 operate for N=1, 2, or 4.

As described above, the conventional PDCCH supports only TDM transmission of the PDCH. Therefore, there is a need for a novel PDCCH structure to support TDM/CDM transmission of the PDCH.

SUMMARY OF THE INVENTION

It is, therefore, an object of the present invention to provide a PDCCH transmitting/receiving apparatus supporting transmission of a PDCH in TDM/CDM.

It is another object of the present invention to provide an apparatus and method for transmitting/receiving control information on a PDCCH in variable slots according to a length of packet data.

It is a further object of the present invention to provide an apparatus and method for transmitting/receiving control information on a PDCCH in variable slots according to a length of packet data, to thereby offer a benefit of channel protection.

To achieve the above and other objects, a method and apparatus are provided for transmitting/receiving packet data control information having a variable length according to a length of packet data.

According to one aspect of the present invention, to transmit packet data control information having a variable length according to the length of packet data in a base station (BS), packet data control information symbols are generated. If packet data is transmitted simultaneously to at least two MSs, the packet data control information symbols include orthogonal code allocation information indicating orthogonal codes used for packet data directed to the at least two MSs and information indicating the MSs as recipients. If the packet data is transmitted to a single MS, the packet data control information symbols include orthogonal code allocation information indicating orthogonal codes used for packet data directed to the MS and information indicating the MS as a recipient. The packet data control information symbols are converted to a format suitable for transmission according to the length of the packet data. The converted packet data control information symbols are spread with a Walsh code of length 32.

According to another aspect of the present invention, an apparatus for transmitting packet data control information having a variable length according to a length of packet data in a BS includes a controller, a parameter controller, and a transmitter. The controller generates packet data control information symbols including orthogonal code allocation information indicating orthogonal codes used for packet data directed to at least two MSs, and information indicating the MSs as recipients, if packet data is transmitted simultaneously to the at least two MSs, and generates packet data control information symbols including orthogonal code allocation information indicating orthogonal codes used for packet data directed to the MS and information indicating the MS as a recipient, if the packet data is transmitted to a single MS. The parameter controller controls conversion of the packet data control information symbols to a format suitable for transmission according to the length of the packet data. The transmitter converts the packet data control information symbols under the control of the parameter controller and transmits the converted symbols.

According to a further aspect of the present invention, an apparatus for receiving packet data control information having a variable length according to the length of packet data from a BS has first to eighth reception units and a controller. The first reception unit receives one-slot packet data control information for one user, decodes the one-slot packet data control information, checks errors in the decoded packet data control information, and outputs a first error detection signal. The second reception unit receives one-slot packet data control information for two users, decodes the one-slot packet data control information, checks errors in the decoded packet data control information, and outputs a second error detection signal. The third reception unit receives two-slot packet data control information for one user, decodes the two-slot packet data control information, checks errors in the decoded packet data control information, and outputs a third error detection signal. The fourth reception unit receives two-slot packet data control information for two users, decodes the two-slot packet data control information, checks errors in the decoded packet data control information, and outputs a fourth error detection signal. The fifth reception unit receives four-slot packet data control information for one user with respect to four-slot packet data, decodes the four-slot packet data control information, checks errors in the decoded packet data control information, and outputs a fifth error detection signal. The sixth reception unit receives four-slot packet data control information for two users with respect to four-slot packet data, decodes the four-slot packet data control information, checks errors in the decoded packet data control information, and outputs a sixth error detection signal. The seventh reception unit receives four-slot packet data control information for one user with respect to eight-slot packet data, decodes the four-slot packet data control information, checks errors in the decoded packet data control information, and outputs a seventh error detection signal. The eighth reception unit receives four-slot packet data control information for two users with respect to eight-slot packet data, decodes the four-slot packet data control information, checks errors in the decoded packet data control information, and outputs an eighth error detection signal. The controller receives the first to eighth error detection signals and determines the length of received packet data according to the first to eighth error detection signals.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The following description is made with the appreciation that control information on a PDCCH is a preamble including information about the length of packet data transmitted on a PDCH and the PDCCH is an SPDCCH. According to an embodiment of the present invention, a transmitter is provided with a CRC adder for adding CRC bits to the control information to allow a receiver to detect errors in the control information, and the receiver operates in BSD to determine the slot length of packet data and the format of the control information. The transmitter and the receiver can be applied in the same manner to communication systems where packet data service is provided and control information is transmitted for efficient packet data transmission.

According to the present invention, the PDCCH is configured so that a receiver can determine whether the PDCH is transmitted in TDM/CDM and how many users are serviced by the PDCH if it is. By way of example, the PDCCH will be described in the context of TDM/CDM packet data transmission for two users. At the same time, it should be appreciated that the PDCCH can be operated for three or more users.

A feature of the PDCCH proposed in the present invention is that it delivers a different amount of control information at a different data rate depending on whether the PDCH is transmitted in TDM or TDM/CDM. Irrespective of the data rate, Walsh codes of length 32 are used as spreading codes. Therefore, convolutional code slots, symbol repetition times and numbers of punctured symbols are presented with respect to the use of length-32 Walsh codes in FIG. 4. Here, N is the number of slots and R is a code rate, as stated before. When the PDCH delivers packet data to two users in TDM/CDM, two PDCCHs are spread with Walsh codes of length 64 and transmitted to the users in the conventional PDCCH transmission method, while one PDCCH is spread with Walsh codes of length 32 to include control information for the users, thereby achieving a higher gain in the present invention. For example, when N=1, a convolutional encoder uses a code rate of ½ but the actual code rate is greater than ½ because code symbols are punctured in a symbol puncturer. For N=1, the actual code rate is 0.7083 (=34/48) in the conventional PDCCH transmission method, while it is 0.5417 (=52/96) in the present invention, thereby achieving channel protection.

Figure 1:
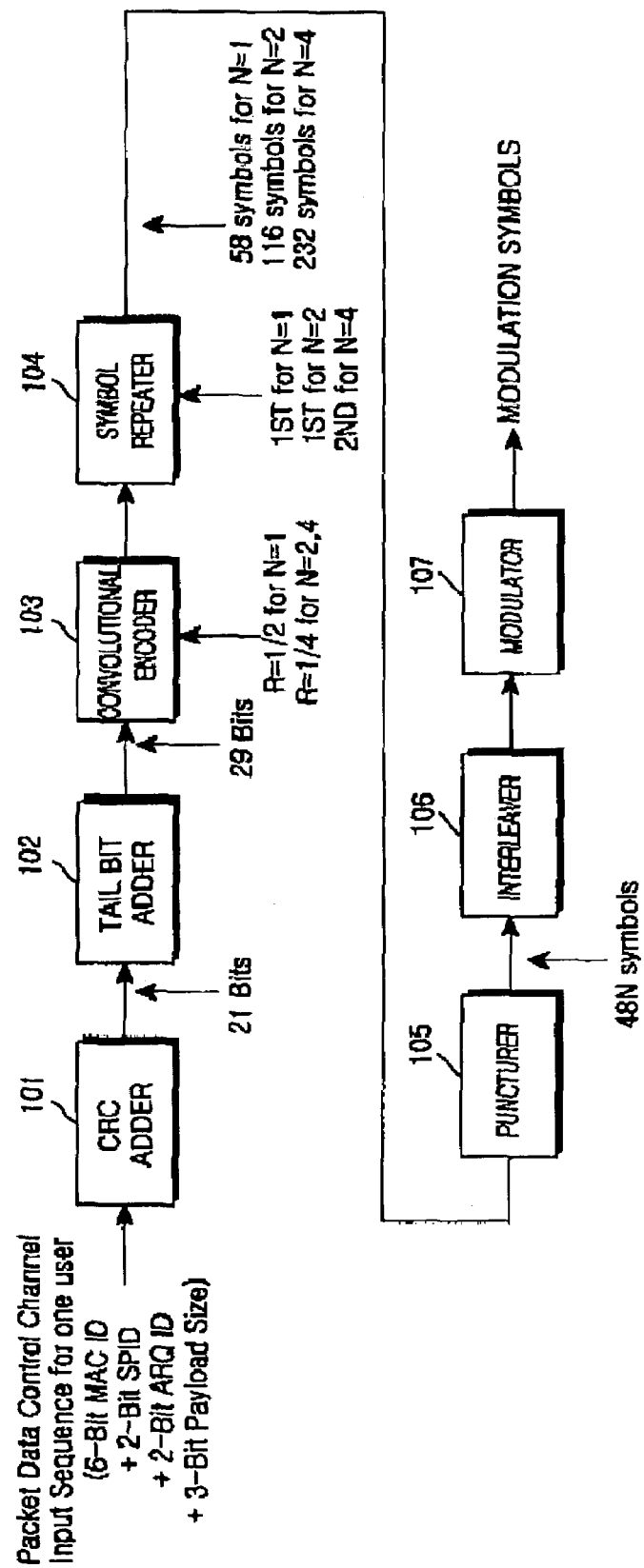
FIG. 1 is a block diagram illustrating a conventional PDCCH transmitter.
Figure 2:
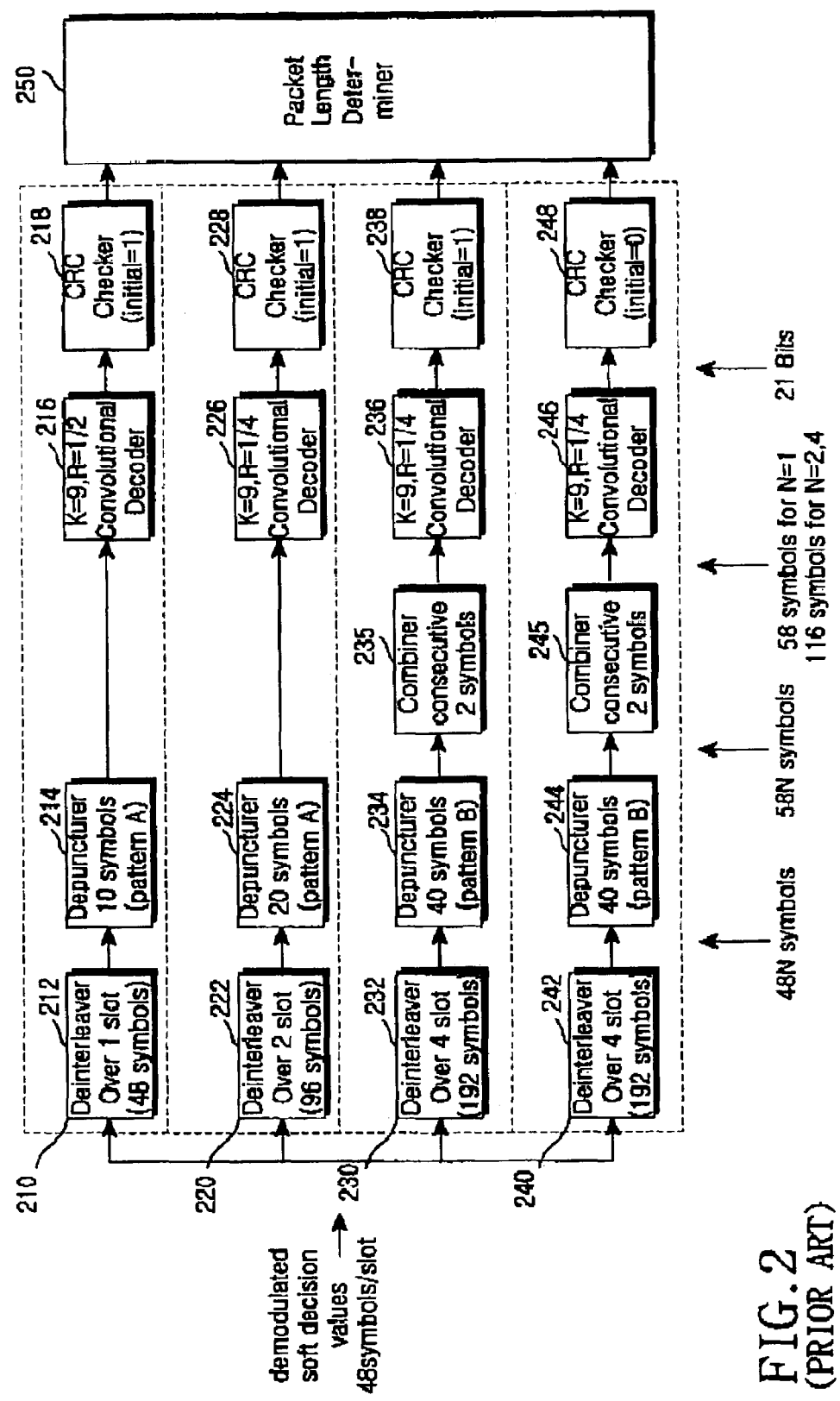
FIG. 2 is a block diagram illustrating a conventional PDCCH receiver.
Figure 3:
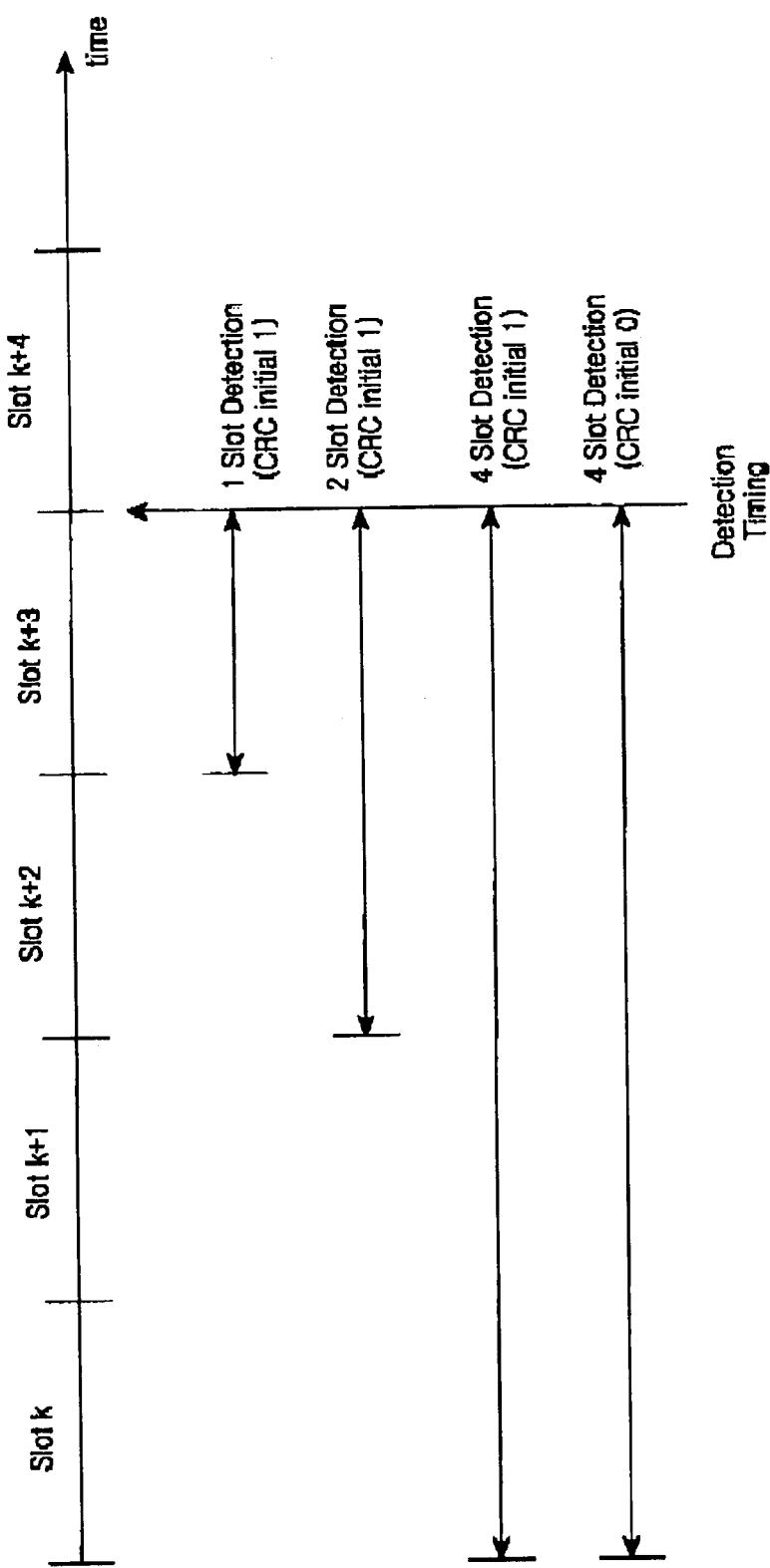
FIG. 3 is a diagram illustrating slot lengths and slot detection timing when a PDCCH is received in 1, 2 or 4 slots at the receiver illustrated in FIG. 2.
Figure 4:
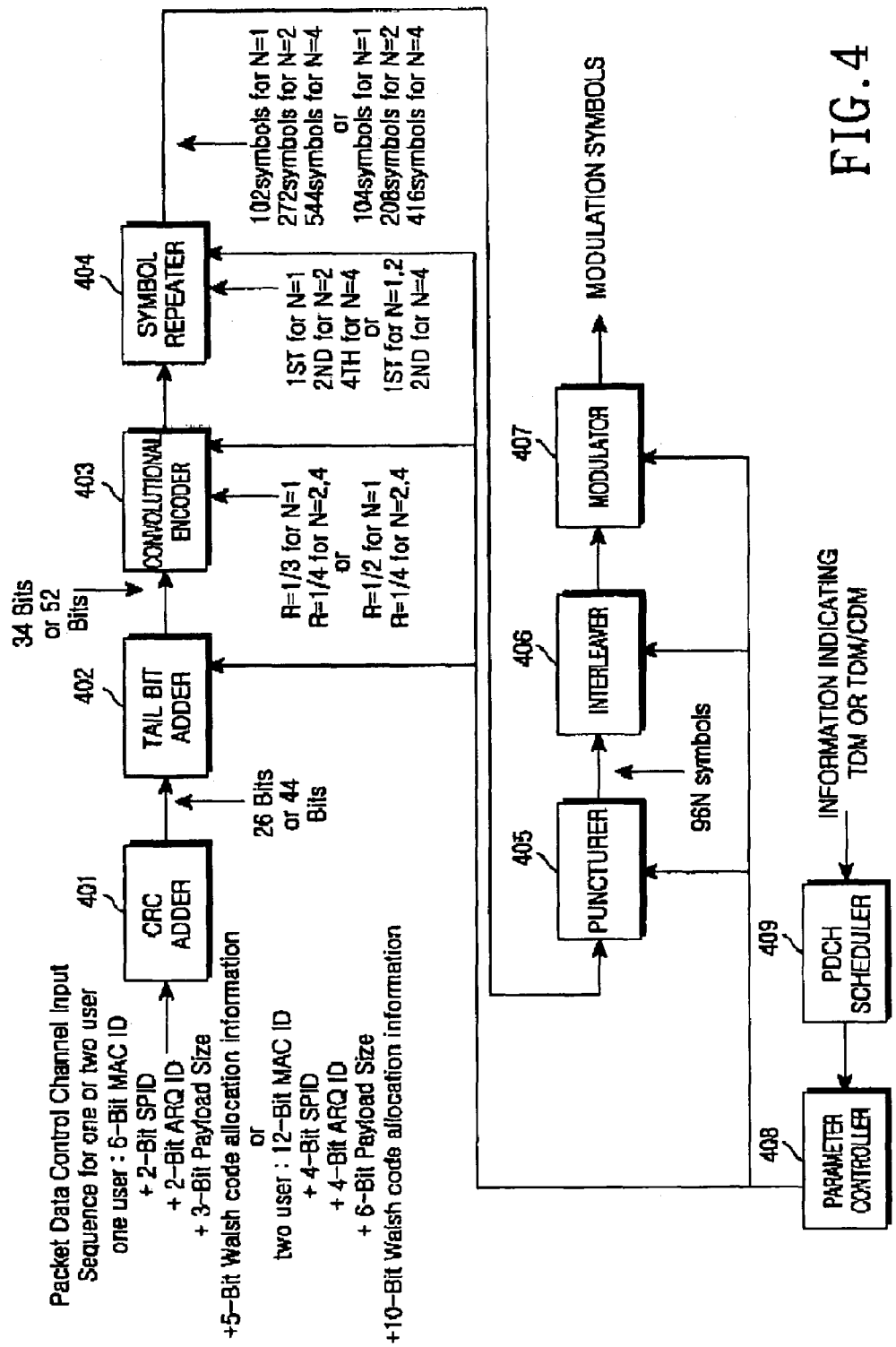
FIG. 4 is a block diagram illustrating a PDCCH transmitter according to an embodiment of the present invention.

FIG. 4 is a block diagram illustrating a PDCCH transmitter according to an embodiment of the present invention. Referring to FIG. 4, a parameter controller 408 receives information about whether the PDCH is to be transmitted in TDM/CDM at a corresponding time point from a PDCH scheduler 409, and controls parameters for blocks 401 to 407. If only TDM is used, a PDCCH input sequence is for a single user and if TDM/CDM is used for two users, a PDCCH input sequence for a second user is additionally provided. In this case, the PDCCH input sequence for the two users is 36 bits (=2×18 bits), and the parameter controller 408 controls each block according to the length of the PDCCH input sequence. Specific parameter values are cited below the blocks. In TDM, a convolutional encoder 403 operates at a code rate of ⅓ for N=1 and at a code rate of ¼ for N=2 or 4. In TDM/CDM, the convolutional encoder 403 operates at a code rate of ½ for N=1 and at a code rate of ¼ for N=2 or 4.

In TDM, a PDCCH input sequence includes a 6-bit MAC ID, a 2-bit SPID (Sub-Packet ID), a 2-bit ARQ ID (Automatic Repeat Request ID), a 3-bit payload size, and 5-bit Walsh code allocation information. The Walsh code allocation information indicates a Walsh code available to an MS (Mobile Station). In TDM/CDM for two users, the length of a PDCCH input sequence is doubled. Thus, the PDCCH input sequence includes 12 bits of MAC IDs, 4 bits of SPIDs, 4 bits of ARQ IDs, 6 bits of payload sizes, and 10 bits of Walsh code allocation information.

According to the embodiment of the present invention, control information is transmitted on the PDCCH, that is, the PDCCH input sequence is assumed to be 18 bits for N slots (N=1, 2 or 4) per user because 5-bit Walsh code allocation information per user is added in the present invention. The control information indicates a Walsh code used for a PDCH for a corresponding user. The length of the PDCCH is not limited to 18 bits and determined irrespective of the length of a preamble. The preamble length varies according to the length of packet data. For example, if the packet data is transmitted in 1, 2, 4, or 8 slots, the preamble has a corresponding length. For example, if the packet data is transmitted in one slot, a one-slot preamble is transmitted. If the packet data is transmitted in 2 slots, the preamble is transmitted in 2 slots. If the packet data occupies 4 slots, the preamble is also transmitted in 4 slots. However, if the packet data is 8 slots, a 4-slot preamble is transmitted to avoid the excess increase of the preamble length.

PDCCH transmission when the PDCH is transmitted in TDM and in TDM/CDM, respectively, will be described herein below with reference to FIG. 4.

A CRC adder 401 adds 8 CRC bits to the 18-bit PDCCH input sequence and outputs 26-bit control information in TDM. Alternatively, in TDM/CDM, the CRC adder 401 adds 8 CRC bits to the 36-bit PDCCH input sequence and outputs 44-bit control information. A tail bit adder 402 adds 8 tail bits with all 0s to the CRC-including control information received from the CRC adder 401.

The convolutional encoder 403 and a symbol repeater 404 operate in a different manner according to TDM transmission or TDM/CDM transmission of the PDCH. In TDM, for N=1, the convolutional encoder 403 encodes the output of the tail bit adder 402 at a code rate of ⅓ and outputs 102 code symbols. For N=2 or 4, the convolutional encoder 403 operates at a code rate of ¼ and outputs 136 code symbols. The symbol repeater 404 simply outputs the 102 code symbols without repetition for N=1, repeats the 136 code symbols once for N=2, and repeats the 136 code symbols three times for N=4. Therefore, the symbol repeater 404 outputs 102, 272, and 544 symbols for N=1, 2, and 4, respectively.

In TDM/CDM for two users, for N=1, the convolutional encoder 403 encodes the output of the tail bit adder 402 at a code rate of ½ and outputs 104 code symbols. For N=2 or 4, the convolutional encoder 403 operates at a code rate of ¼ and outputs 208 code symbols. The symbol repeater 404 simply outputs the 104 code symbols and the 208 code symbols without repetition for N=1 and 2 and repeats the 208 code symbols once for N=4. Therefore, the symbol repeater 404 outputs 104, 208, and 416 symbols for N=1, 2, and 4, respectively.

A puncturer 405 punctures symbols in the output of the symbol repeater 404 according to N in order to minimize performance degradation and match to an appropriate data rate. In TDM, the puncturer 405 punctures 6, 80, and 160 symbols in the output of the symbol repeater 404 for N=1, 2, and 4, respectively. An interleaver 406 interleaves the punctured symbols. A modulator 407 modulates the interleaved symbols in a modulation scheme such as QPSK (Quadrature Phase Shift Keying).

Figure 5:
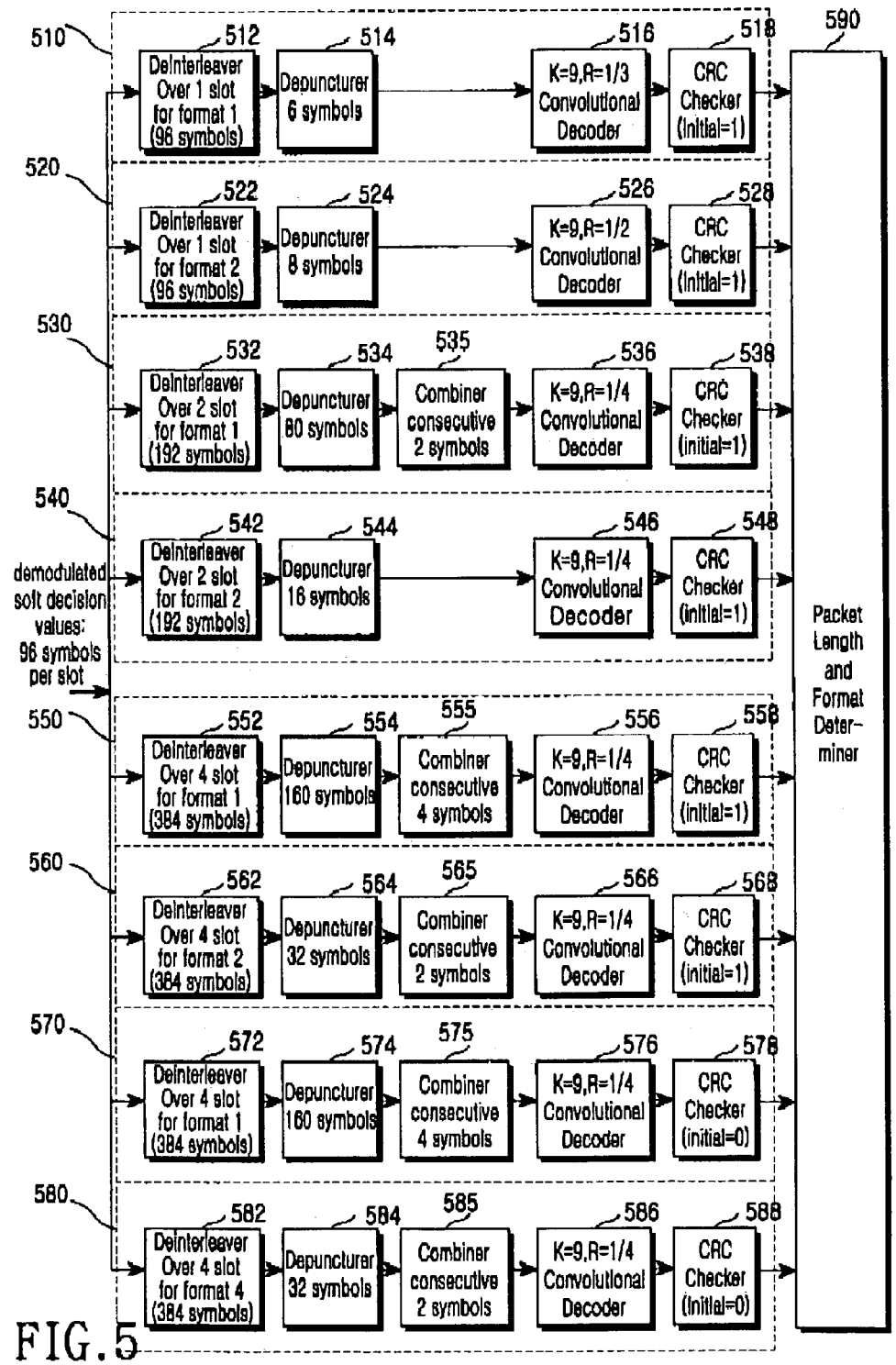
FIG. 5 is a block diagram illustrating a PDCCH receiver according to the embodiment of the present invention.

FIG. 5 is a block diagram illustrating a PDCCH receiver according to the embodiment of the present invention. Referring to FIG. 5, to determine the slot length of packet data received from the transmitter and determine the format of the PDCCH, the receiver includes first to eighth reception units 510 to 580. The first to eighth reception units 510 to 580 CRC-check the received packet data, thereby determining the slot length of the packet data and the format of the PDCCH. Demodulated soft decision values (96 symbols per slot) are input to the first to eighth reception units 510 to 580. The first reception unit 510 processes a 1-slot preamble in format 1 for 1-slot packet data, the second reception unit 520 processes a 1-slot preamble in format 2 for 1-slot packet data, the third reception unit 530 processes a 2-slot preamble in format 1 for 2-slot packet data, the fourth reception unit 540 processes a 2-slot preamble in format 2 for 2-slot packet data, the fifth reception unit 550 processes a 4-slot preamble in format 1 for 4-slot packet data, the sixth reception unit 560 processes a 4-slot preamble in format 2 for 4-slot packet data, the seventh reception unit 570 processes a 4-slot preamble in format 1 for 8-slot packet data, and the eighth reception unit 580 processes a 4-slot preamble in format 2 for 8-slot packet data. Format 1 indicates transmission of a PDCCH for one user in TDM transmission of packet data on a PDCH, and format 2 indicates transmission of a PDCCH for two users in TDM/CDM transmission of packet data on a PDCH for the two users.

In each reception unit, a deinterleaver deinterleaves the 96 symbols per slot according to a corresponding slot length and a depuncturer depunctures the deinterleaved symbols according to the corresponding slot length. In the third reception unit 530 and the fifth to eighth reception units 550 to 580, combiners 535 and 555 to 585 combine every two adjacent symbols in correspondence to the operation of the symbol repeater 404 illustrated in FIG. 4.

First and second convolutional decoders 516 and 526 decode the depunctured symbols received from the depuncturers 514 and 524 at a code rate of ⅓ and at a code rate of ½, respectively. Third to eighth convolutional decoders 536 to 586 decode their input symbols at a code rate of ¼.

CRC checkers 518 to 588 CRC-check decoded symbols using predetermined initial values. A packet length and format determiner 590 determines a packet data length and the format of the PDCCH according to the reception results received from the reception units 510 to 580. The reception units 510 to 580 may be separated physically or integrated into one reception unit with different reception parameters.

In accordance with the present invention as described above, the proposed PDCCH enables both TDM/TDM packet transmission and TDM/CDM packet transmission on the PDCH in a mobile communication system supporting packet data service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting packet data control information having a variable length in a transmitting apparatus of a base station (BS), which has an orthogonal code space arranged with a plurality of orthogonal codes, and transmits packet data spread with the orthogonal codes to a single mobile station (MS) or simultaneously transmits to two or more MSs packet data spread with different orthogonal codes in the orthogonal code space, the method comprising the steps of:

determining if a packet data is transmitted simultaneously to at least two MSs rather than a single MS;

generating packet data control information;

delivering different amount of control information to a single MS than if the packet data is transmitted simultaneously to at least two MSs;

converting the packet data control information to a format suitable for transmission on a packet data control channel (PDCCH) by differently applying at least one of the number of error detection bits, the number of tail bits, code rate, the number of reception and amount of puncturing according to the amount of control information;

wherein the packet data control information includes orthogonal code allocation information indicating orthogonal code used for packet data directed to the MS and information necessary for decoding the packet data, when the packet data is transmitted to the single MS; and the packet data control information includes orthogonal code allocation information indicating orthogonal codes used for packet data directed to at least two MSs and information necessary for decoding the packet data when the packet data is transmitted simultaneously to the at least two MSs.

2. The method of claim 1, wherein the MS indicating information includes user information, SPIDs (Sub-Packet IDs), ARQ IDs (Automatic Repeat Request IDs), and payload sizes.

3. The method of claim 1, wherein the orthogonal code allocation information provided to each MS is last allocation information used for a packet data channel to be transmitted to each MS.

4. The method of claim 1, wherein the symbol converting step comprises the steps of:

adding a predetermined number of error detection bits to the packet data control information symbols;

adding a predetermined number of tail bits to the error detection bit-attached symbols;

convolutionally encoding the tail bit-including symbols at a predetermined code rate according to a number of transmission slots;

repeating the encoded symbols according to the transmission slot number; and puncturing the repeated symbols according to a transmission slot length.

5. The method of claim 1, further comprising the step of spreading the packet data control information symbols with Walsh codes of length 32.

6. A transmitting apparatus for transmitting packet data control information having a variable length in a base station (BS) that has an orthogonal code space arranged with a plurality of orthogonal codes, and which transmits packet data spread with the orthogonal codes to a single mobile station (MS) or simultaneously transmits to two or more MSs packet data spread with different orthogonal codes in the orthogonal code space, the apparatus comprising the steps of:

a controller for determining if a packet data is transmitted simultaneously to at least two MSs rather than a single MS and for generating packet data control information delivering different amount of control information to a single MS than if the packet data is transmitted simultaneously to at least two MSs;

a parameter controller for controlling conversion of the packet data control information to a format suitable for transmission on a packet data control channel by differently applying at least one of the number of error detection bits, the number of tail bits, code rate, the number of repetition and amount of puncturing according to the amount of control information;

a transmitter for converting the packet data control information symbols under control of the parameter controller and transmitting the converted symbols;

wherein the packet data control information includes orthogonal code allocation information indicating orthogonal code used for packet data directed to the MS and information necessary for decoding the packet data, when the packet data is transmitted to the single MS; and the packet data control information includes orthogonal code allocation information indicating orthogonal codes used for packet data directed to at least two MSs and information necessary for decoding the packet data when the packet data is transmitted simultaneously to the at least two MSs.

7. The apparatus of claim 6, wherein the transmitter comprises:

an error detection bit adder for adding a predetermined number of error detection bits to the packet data control information symbols;

a tail bit adder for adding a predetermined number of tail bits to the error detection bit-attached symbols;

a convolutional encoder for convolutionally encoding the tail bit-including symbols at a predetermined code rate according to a number of transmission slots;

a symbol repeater for repeating the encoded symbols according to the transmission slot number; and a puncturer for puncturing the repeated symbols according to a transmission slot length.

8. The apparatus of claim 7, wherein the parameter controller controls the code rate to be ½ if the transmission slot number is one, and to be ¼ if the transmission slot number is at least two.

9. The apparatus of claim 7, wherein the parameter controller controls the encoded symbols not to be repeated if the transmission slot number is equal to or less than two, and to be repeated once if the transmission slot number is four.

10. The apparatus of claim 7, wherein the parameter controller controls the puncturer to output (96×the transmission slot number) by puncturing the repeated symbols.

11. An apparatus for receiving packet data control information having a variable length from a base station (BS) that has an orthogonal code space arranged with a plurality of orthogonal codes, and which transmits packet data spread with the orthogonal codes to a single mobile station (MS) or simultaneously transmits to two or more MSs packet data spread with different orthogonal codes in the orthogonal code space in a mobile communication system, the apparatus comprising:

a first reception unit for receiving one-slot packet data control information for one user, decoding the one-slot packet data control information, checking for errors in the decoded packet data control information, and outputting a first error detection signal;

a second reception unit for receiving one-slot packet data control information for two users, decoding the one-slot packet data control information, checking for errors in the decoded packet data control information, and outputting a second error detection signal;

a third reception unit for receiving two-slot packet data control information for one user, decoding the two-slot packet data control information, checking for errors in the decoded packet data control information, and outputting a third error detection signal;

a fourth reception unit for receiving two-slot packet data control information for two users, decoding the two-slot packet data control information, checking for errors in the decoded packet data control information, and outputting a fourth error detection signal;

a fifth reception unit for receiving four-slot packet data control information for one user with respect to four-slot packet data, decoding the four-slot packet data control information, checking for errors in the decoded packet data control information, and outputting a fifth error detection signal;

a sixth reception unit for receiving four-slot packet data control information for two users with respect to four-slot packet data, decoding the four-slot packet data control information, checking for errors in the decoded packet data control information, and outputting a sixth error detection signal;

a seventh reception unit for receiving four-slot packet data control information for one user with respect to eight-slot packet data, decoding the four-slot packet data control information, checking for errors in the decoded packet data control information, and outputting a seventh error detection signal;

an eighth reception unit for receiving four-slot packet data control information for two users with respect to eight-slot packet data, decoding the four-slot packet data control information, checking for errors in the decoded packet data control information, and outputting an eighth error detection signal; and a controller for receiving the first to eighth error detection signals and determining a length of the received packet data according to the first to eighth error detection signals.

* * * * *